Figure 1:
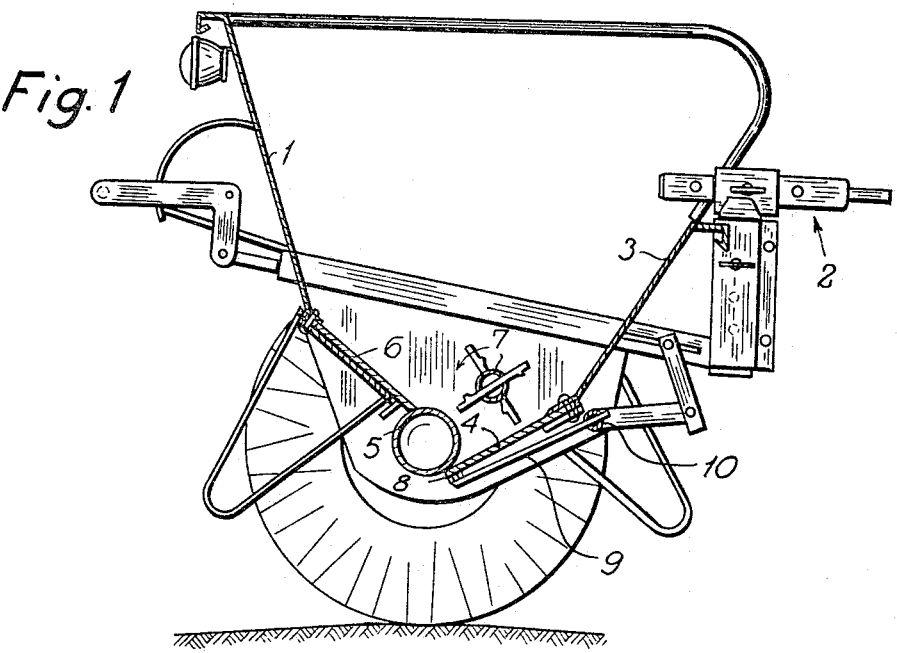

Sept. 27, 1966 A. THOMSEN 3,275,199
SPREADING DEVICE FOR FINE STREWING MATERIAL
SUCH AS SALT OR FERTILIZERS
Filed Nov. 9, 1964

Inventor
Alfred Thomsen
By Cushman, Darby & Cushman
Attorneys

United States Patent Office 3,275,199
Patented Sept. 27, 1966

3,275,199
SPREADING DEVICE FOR FINE STREWING MATERIAL SUCH AS SALT OR FERTILIZERS
Alfred Thomsen, Askov, pr. Vejen, Denmark
Filed Nov. 9, 1964, Ser. No. 409,760
Claims priority, application Denmark, Sept. 19, 1964,
4,617/64
6 Claims. (Cl. 222—313)

In spreading salts on roads and fertilizers in fields it is essential that the material can be accurately dosed and uniformly distributed over the area, since the materials are in themselves rather costly and may cause damage in case of excessive dosing.

The known spreading devices have been found satisfactory for spreading coarser materials such as gravel, but cannot fully meet the requirements made for spreading finer materials such as salt and fertilizers.

It is the object of the present invention to provide a spreading device of the aforesaid kind which is capable of giving exact dosing and uniform distribution of fine strewing materials.

The device according to the invention consists of a container the bottom of which has a slot extending transversely of the direction of travel of the device, along which slot there is provided a rotating spreading roller with projecting carrier members and below which roller there is a plate of rubber or similar resilient material pressing with its upward-facing surface against the underside of the roller, the said plate being of a material so soft that the carrier members, which consist of a large number of low, in vertical projection rather steep ribs, may be substantially received in the rubber material when the plate, which opposite the roller is supported by one or more regulable pressure members, is pressed against the roller by the said pressure members.

In this design the rubber plate will rest in contact with the roller along its entire length, tightly enclosing the carrier members, and, thus there is no actual discharge slot as is the case in the known spreading devices. The fine material to be strewn will be located as a very thin layer around the ribs and when these are passing the free edge of the rubber plates, the material will be "scraped" off the ribs which owing to their oblique position are moving slightly sideways in relation to the rubber plate, and this gives an eminently fine, regulable and uniform distribution of the material so that it is possible to lay a very thin, uniform layer of fine-grained material such as salt or a fertilizer. By easing the pressure exerted by the pressure members against the rubber plate it is possible to increase the amount of material spread, simultaneously with, however, maintaining a uniform distribution of the increased dosage. The amount of material may also be regulated by changing the speed of the spreading roller.

In a convenient form the ribs according to the invention may be formed by a steel wire welded to the roller surface and arranged screwthread fashion. The effect obtained is that the material is practically "screwed" out of the ribs received in the rubber material, whereby a very uniform distribution is obtained.

Figure 2:
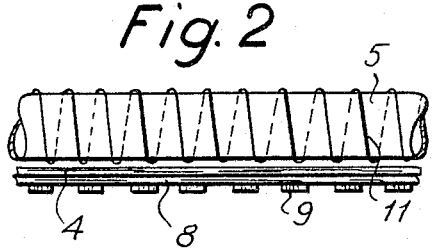
Figure 3:
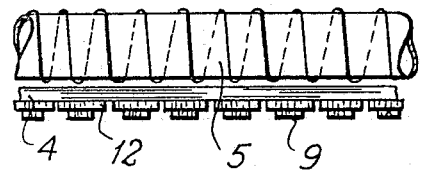
Figure 4:
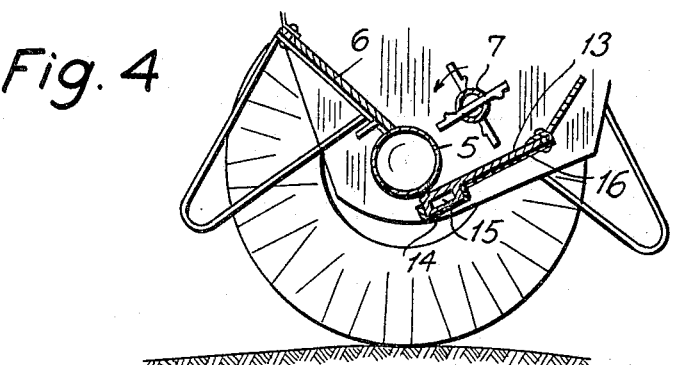

Various embodiments of a spreading device according to the invention will now be described with reference to the drawing, in which FIGURE 1 is a section through a spreading device, viewed from the side, FIGURE 2 shows a part of a spreading roller, viewed from the end of the spreading device, FIGURE 3 is the same as in FIGURE 2, showing a modified embodiment, and FIGURE 4 is the same as in FIGURE 1, showing another modified embodiment.

The spreading device according to FIGURE 1 consists of a container 1 which by means of coupling members 2 is adapted to be connected to a vehicle travelling in the direction from the left to the right in FIGURE 1. The container 1 has an inclined front wall 3 to which is attached a rubber plate 4 which constitutes a part of the container bottom, lying in contact with the underside of a spreading roller 5 which rotates in the direction indicated by the arrow, while another rubber plate 6 is resting in contact with the upper side of the said roller. The bottom of the container is thus closed by the two plates 4 and 6 and the roller 5. An agitating member 7 serves to keep the strewing material such as salt or fertilizers lying on the bottom of the container in agitation so as to prevent the formation of lumps or bridges.

Along its outer part, which rests in contact with the underside of the roller 5, the rubber plate 4 is supported by a longitudinal rail 8, see also FIGURE 2, which rail is supported by the extreme end of a number of spring lamellae 9 distributed along the roller and attached to a regulating mechanism 10 by means of which the lamellae may be turned so as to regulate the pressure exerted against the rail and consequently the pressure exerted by the plate 4 against the roller 5.

The roller 5 is provided with carrier members formed of a steel wire arranged screwthread fashion around the roller and welded to same. The ribs 11 thus formed extend, viewed in vertical projection according to FIGURE 2, comparatively steeply so that there is a large number of windings.

The rubber plate 4 is of comparatively soft material so that the ribs 11 may be fully received in the material when the plate is forced against the roller 5 by the rail 8. The rubber plate is thus resting in contact with the whole surface of the roller so that no actual discharge slot is formed and the fine strewing material will be scraped out in a very fine layer and be discharged as finely divided jets opposite each point of intersection between a rib portion and the rubber plate. It will be appreciated that the said points of intersection and consequently the jets travel sideways during the rotation of the roller, which contributes to ensure the efficient distribution of the material.

The amount of material strewn depends upon the force with which the extreme part of the rubber plate 4 is pressed against the surface of the roller and in the embodiment according to FIGURES 1–3 this is regulated by the regulating mechanism 10. It will be evident from FIGURE 1 that the amount of material in the container 1 will rest with its whole weight pressing on the rubber plate 4 which will curve more and more with an increasing amount of material. The said pressure does not act upon the spring lamellae 9 and consequently not upon the pressure against the roller so that the amount of material in the container does not act upon the pressure exerted by the rubber plate against the spreading roller and consequently the dosing.

In the embodiment according to FIGURE 3 the continuous rail 8 is substituted by a number of rail sections 12, each supported by a spring lamella 9. Instead of using a rail section for each spring lamella there may be provided longer rail sections, each supported by several spring lamellae.

In the embodiment according to FIGURE 4 the rubber plate 13 is provided with a projecting part 14 facing away from the roller 5. Together with the plate 13 the said part 14 defines a closed cavity 15. The whole rubber plate 13 with the projecting part 14 is supported by a rigid, plate-shaped supporting member 16. The closed cavity 15 is by means of pipings (not shown) connected with pressure medium supply means, for example a compressed air source adapted to maintain a variable, regulable pressure in the cavity 15 which thus form the pressure means for pressing the rubber plate against the roller 5. In this embodiment it is possible to provide a very efficient regulation of the spreading.

What I claim and desire to secure by Letters Patent is:

1. A spreading device for fine strewing material such as salt or fertilizers and with a container the bottom of which has a slot extending transversely of the direction of travel of the device, along which slot there is provided a rotating spreading roller with projecting carrier members and below which roller there is a plate of rubber or a similar resilient material pressing with its upward-facing surface against the underside of the roller, the said plate being of a material so soft that the carrier members, which consist of a large number of low, in vertical projection rather steep ribs having substantially greater longitudinal spacing than the longitudinal thickness of said ribs, may be substantially received in the rubber material when the plate, which opposite the roller is supported by one or more regulable pressure members, is pressed against the roller by the said pressure members.

2. A device as claimed in claim 1, characterised in that the ribs are formed of a steel wire welded to the roller surface and arranged in screwthread fashion.

3. A spreading device for fine strewing material such as salt or fertilizers and with a container the bottom of which has a slot extending transversely of the direction of travel of the device, along which slot there is provided a rotating spreading roller with projecting carrier members and below which roller there is a plate of rubber or a similar resilient material pressing with its upward-facing surface against the underside of the roller, the said plate being of a material so soft that the carrier members, which consist of a large number of low, in vertical projection rather steep ribs, may be substantially received in the rubber material when the plate, which opposite the roller is supported by one or more regulable pressure members, is pressed against the roller by the said pressure members, the carrier members consisting of separated ribs arranged as ellipses forming an acute angle with the axis of the roller.

4. A spreading device for fine strewing material such as salt or fertilizers and with a container the bottom of which has a slot extending transversely of the direction of travel of the device, along which slot there is provided a rotating spreading roller with projecting carrier members and below which roller there is a plate of rubber or a similar resilient material pressing with its upward-facing surface against the underside of the roller, the said plate being of a material so soft that the carrier members, which consist of a large number of low, in vertical projection rather steep ribs, may be substantially received in the rubber material when the plate, which opposite the roller is supported by one or more regulable pressure members, is pressed against the roller by the said pressure members, the pressure means consisting of a rail which is parallel with the roller and resting in contact with the resilient plate opposite the roller, supported by a number of spring lamellae the outer ends of which rest in contact with the rail, their inner ends being pivotally, adjustably attached to the device.

5. A device as claimed in claim 4, characterised in that the rail is divided into several sections.

6. A spreading device for fine strewing material such as salt or fertilizers and with a container the bottom of which has a slot extending transversely of the direction of travel of the device, along which slot there is provided a rotating spreading roller with projecting carrier members and below which roller there is a plate of rubber or a similar resilient material pressing with its upward-facing surface against the underside of the roller, the said plate being of a material so soft that the carrier members, which consist of a large number of low, in vertical projection rather steep ribs, may be substantially received in the rubber material when the plate, which opposite the roller is supported by one or more regulable pressure members, is pressed against the roller by the said pressure members, the pressure means consisting of a projecting part of the resilient plate, the said part facing away from the roller and forming together with the plate a closed cavity which is supported by a rigid supporting member and connected with regulable fluid pressure medium supply means whereby increasing fluid pressure urges at least part of said resilient plate more intimately between said ribs and decreasing fluid pressure urges the last-mentioned part of said resilient plate less intimately between said ribs.

References Cited by the Examiner

UNITED STATES PATENTS

| 351,483 | 10/1886 | Baldwin | 222—414 X |
| 2,628,002 | 2/1953 | Peterson | 222—311 X |
| 2,733,838 | 2/1956 | Neff | 222—414 |
| 3,072,290 | 1/1963 | De Biasi | 222—410 X |

ROBERT B. REEVES, *Primary Examiner.*

HADD S. LANE, RAPHAEL M. LUPO, *Examiners.*